UNITED STATES PATENT OFFICE.

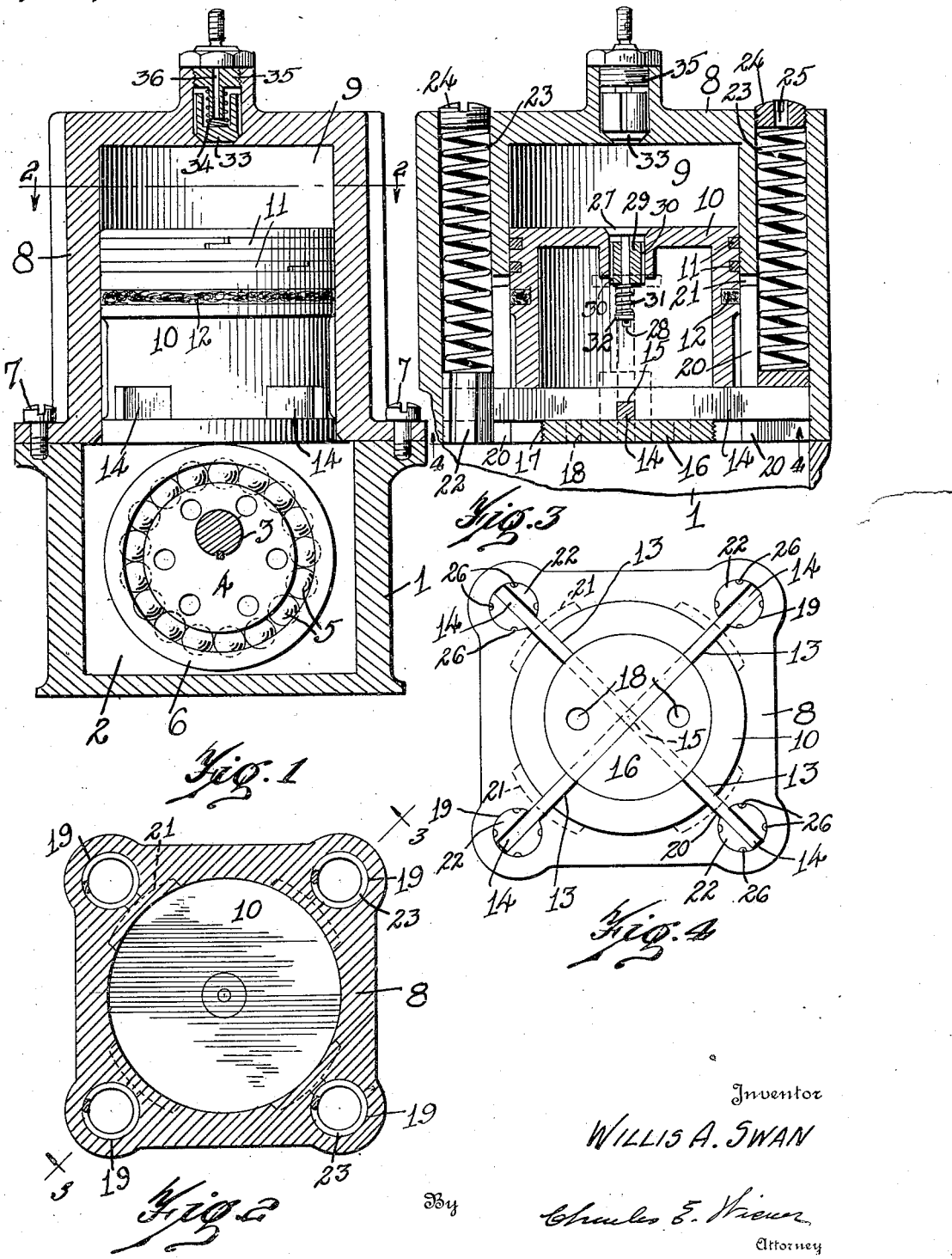

WILLIS A. SWAN, OF PORT HURON, MICHIGAN.

AIR PUMP.

1,424,123.	Specification of Letters Patent.	Patented July 25, 1922.

Application filed May 17, 1920. Serial No. 382,165.

*To all whom it may concern:*

Be it known that I, WILLIS A. SWAN, a citizen of the United States, residing at Port Huron, county of St. Clair, State of Michigan, have invented a certain new and useful Improvement in Air Pumps, and declare the following to be a full, clear, and exact description of the same, such as will enable others skilled in the art to which it pertains to make and use the same, reference being had to the accompanying drawings, which form a part of this specification.

This invention relates to air pumps, more particularly of a type for use in connection with automobile engines and the object of the invention is to provide a pump having a piston reciprocable in one direction by an eccentric and provided with automatic means for returning the piston subsequent to operation thereof by the eccentric. A further object of the invention is to provide an air pump of the character described which is of comparatively low manufacturing cost, is excellently adapted for use in connection with automobile engines and provides a simple and efficient pump for the inflation of tires or for like purposes. A still further object of the invention is to provide a pump of the character described which, by the peculiar construction herein described, is automatically oiled by operation of the eccentric and which will not easily get out of order. These objects and the several novel features of the invention are hereinafter more fully described and claimed and the preferred form of construction by which these objects are attained is shown in the accompanying drawings in which—

Fig. 1 is a vertical section through an air pump embodying my invention.

Fig. 2 is a section taken on line 2—2 of Fig. 1.

Fig. 3 is a section taken on line 3—3 of Fig. 2.

Fig. 4 is a section taken on line 4—4 of Fig. 3.

The pump consists of a base or casing 1 which is hollow as shown in Fig. 1, providing a chamber 2 adapted to be partially filled with lubricating oil. Rotatably mounted in the opposite sides of the casing 1 is a shaft 3 and keyed to the shaft is an eccentric 4 provided with a ball race in the periphery thereof in which the balls 5 are mounted. An annular ring 6 is also provided having a ball race on the inner periphery thereof providing a cap for the eccentric which is rotatable thereon. Secured by the bolts 7 to the casing 1 is a cylinder 8 provided with a large cylindrical chamber 9 in which a piston 10 is reciprocable. This piston at the upper end is provided with a pair of packing rings 11 adapted to closely fit the walls of the cylinder and a felt ring 12 is provided, which during the operation of the pump, becomes saturated with oil and lubricates the walls of the cylinder so that the piston 10 is reciprocable therein without excessive friction. At the lower end the piston 10 is provided with diametrically opposed slots 13 shown more particularly in Fig 4, there being four such slots adapted to receive the cross members 14 each member 14 at its center being notched at 15 so as to fit together in alignment with the opposite member 14. To secure these members 14 in position in the piston I provide a member 16 threaded at its periphery and adapted to engage the threads 17 on the interior of the piston, the member 16 being provided with openings 18 to receive a spanner wrench by which the member 16 may be tightened, thus tightly securing the cross members 14 in place in the slots 13 as will be readily understood from Fig. 3. The openings 18 in the member 16 also provide inlets through which air may pass to the interior of the piston.

As indicated in Figs. 2 and 4 the cylinder 8 is enlarged at four diametrically opposite points and a number of chambers or spring receptacles 19 are provided in these enlarged portions. A slot 20 is provided between each chamber 19 and the cylindrical chamber 9 in which the members 14 are adapted to reciprocate in conjunction with the piston, the slots 20 extending to a T-head 21 at the upper end providing retaining slots for lubricating oil. Each member 14 at its outer end is provided with a cylindrical member 22 notched to fit over the ends of the members 14 and riding the chambers 19 and, as indicated in Figs. 2 and 3, springs 23 are provided engaging these members 22 and being placed under tension by the screw members 24 which are each provided with an air inlet aperture 25 as indicated at the left of Fig. 3. As will be understood from the drawing, the screw members 24 may be threaded up or down in the chambers 19 to increase or reduce the pressure on the springs 23 as may be desired. The members 22 are provided with a plurality of vertically extending grooves 26 through which air may pass into the casing 1 and thence to the interior of the hollow piston 10 through the apertures 18 in the member 16. In the upper end of the hollow piston 10 I provide a check valve 27 having a stem 28 reciprocable in a member 29 having a vertically extending groove 30 through which air may pass. On the lower end of the valve stem I provide a spring 31 engaging against a washer 32, the said spring being compressed between the washer 32 and the lower face of the member 29 thereby tending to hold the valve 27 closed. Also in the upper end of the cylinder 8 I provide a valve 33 which is hollow and in which is positioned a compression spring 34. Threaded into the upper end of the cylinder is a member 35 which is provided with a vertically extending aperture 36 through which air may be discharged, the spring 34 pressing against the member 35 and tending to hold the valve 33 closed.

In operation the shaft 3 is connected up with a source of power, such as an automobile engine or the like, the shaft 3 being rotated thereby which operates the eccentric, the ring 6 of the eccentric engaging the lower face of the member 16 of the piston 10. Due to the friction between the members 6 and 16 the member 6 tends to remain stationary, the member 4 during rotation reciprocating the member 6 through the ball bearings 5. In this manner the piston is moved upwardly against the tension of the springs 23 as will be readily understood, and during said movement the pressure in the chamber 9 overcomes the pressure of the spring 34 of the discharge valve in the cylinder head thereby discharging compressed air through the conduit 36. During the upward movement of the piston 10 a vacuum is created in the chamber 2 of the casing 1, which is relieved by a flow of air through the openings 25 in the members 24 thence through the chambers 19 and through the grooves 26 in the members 22 and thence into the chamber 2 and through the apertures 18 into the chamber in the hollow piston 10. As the eccentric is moved back to the position shown in Fig. 1, the pressure of the springs 23 against the members 22 returns the piston to its former position thus creating a vacuum in the chamber 9. As the vacuum increases in the chamber 9 the pressure of the spring 31 of the valve 27 is overcome thus opening the valve 27 and allowing the chamber 9 to fill with air whereupon the operation is continued as before. During operation considerable oil is splashed or thrown onto the inner walls of the cylinder 8 by rotation of the eccentric thus lubricating the piston and cylinder and saturating the felt washer 12 with oil, at the same time lubricating the ball bearings 5 of the eccentric and providing a film of oil between the members 6 and 16 so that should the member 6 be rotated only a slight wear is caused between the two members.

From the foregoing description it becomes evident that the device is of comparatively low manufacturing cost, is exceedingly cheap in operation, is very efficient for the purpose described and accomplishes the objects desired.

Having thus briefly described my invention, its utility and mode of operation what I claim and desire to secure by Letters Patent of the United States is—

1. In an air pump, the combination of a casing, an eccentric rotatably mounted therein, a cylinder secured to the casing having a large central chamber and a series of smaller diametrically opposed chambers arranged thereabout, a hollow piston reciprocably mounted in the central chamber, a check valve in the upper end thereof, a check valve in the upper end of the cylinder, a series of arms extending from the piston through the portion of the cylinder wall between each of the smaller and the large chamber, a member engaging over the extreme end of each arm fitting the chamber, and a spring in each smaller chamber engaging the members on the said arms, the said smaller chambers providing an air inlet to the interior of the casing.

2. In an air pump, the combination of a casing, having an air inlet, an eccentric rotatably mounted therein, a cylinder secured to the casing having a large central chamber, a check valve in the upper end thereof, a series of smaller diametrically opposed chambers arranged about the central chamber, a hollow piston reciprocable in the large central chamber by rotation of the eccentric, a check valve in the upper end thereof, a series of arms extending from the piston into the small chambers and springs in the said small chambers engaging the respective arms adapted to return the piston after reciprocation thereof by the eccentric.

3. In an air pump, the combination of a casing adapted to contain lubricating oil and having an air inlet, an eccentric rotatably mounted therein, a cylinder secured to the casing having a large central chamber, a check valve in the upper end thereof, a series of smaller diametrically opposed chambers arranged thereabout, a hollow piston reciprocably mounted in the large central chamber having a series of notches in the lower wall thereof, a check valve in the upper end thereof, a pair of cross arms seating in the said notches and extending from the piston in the smaller chambers, a member threaded into the lower open end of the piston tightly securing the cross arms in the notches therein and providing a face against which the eccentric when rotated to move the piston upwardly and springs in the smaller chambers acting against the ends of the arms to return the piston after actuation by the eccentric.

4. In an air pump, the combination of a casing, an eccentric rotatably mounted therein, a cylinder secured to the casing having a large central chamber and a series of small diametrically opposed chambers arranged thereabout, a check valve in the upper end of the cylinder, a hollow piston reciprocably mounted in the large central chamber, a check valve in the upper end thereof, a series of arms extending from the piston into the smaller chambers, the said smaller chambers providing an air inlet to the interior of the casing, springs in the said chamber engaging the ends of the arms and tending to hold the lower face of the piston in contact with the face of the eccentric and means for adjusting the pressure of the springs.

In testimony whereof, I sign this specification.

WILLIS A. SWAN.